US011946211B1

(12) United States Patent
Van Bergen et al.

(10) Patent No.: US 11,946,211 B1
(45) Date of Patent: Apr. 2, 2024

(54) PORTLAND CEMENT CONCRETE SLAB-ON-GROUND FABRICATION METHOD FOR PERFORMANCE SATISFACTION AND REDUCED CARBON EMISSION

(71) Applicant: Axiom Carbon Index, LLC, Ft. Myers, FL (US)

(72) Inventors: Peter J. Van Bergen, Williamsburg, VA (US); S. Allen Face, III, Sleepy Hollow, IL (US)

(73) Assignee: AXIOM CARBON INDEX, LLC, Ft. Myers, FL (US)

( * ) Notice: Subject to any disclaimer, the term of this patent is extended or adjusted under 35 U.S.C. 154(b) by 0 days.

(21) Appl. No.: 18/460,883

(22) Filed: Sep. 5, 2023

(51) Int. Cl.
*E01C 3/00* (2006.01)
*C04B 7/02* (2006.01)
*E01C 19/48* (2006.01)
*G01W 1/10* (2006.01)
*G06Q 30/0207* (2023.01)
*G06Q 30/0241* (2023.01)
*H04W 4/06* (2009.01)

(52) U.S. Cl.
CPC .................. *E01C 3/00* (2013.01); *C04B 7/02* (2013.01); *E01C 19/488* (2013.01); *G01W 1/10* (2013.01); *G06Q 30/0207* (2013.01); *G06Q 30/0277* (2013.01); *H04W 4/06* (2013.01)

(58) Field of Classification Search
CPC ........ E01C 3/00; E01C 19/488; E01C 19/288; C04B 7/02; G01W 1/10; G01W 2203/00; G06Q 30/0207; H04W 4/06
See application file for complete search history.

(56) References Cited

U.S. PATENT DOCUMENTS

| 2,262,704 | A | * | 11/1941 | Tompkins | ............... | E01C 23/03 |
| | | | | | | 248/176.1 |
| 4,106,296 | A | * | 8/1978 | Leonard, Jr. | ............ | E02D 17/20 |
| | | | | | | 47/9 |
| 4,202,145 | A | * | 5/1980 | Coulter | ................. | E04G 11/365 |
| | | | | | | 52/294 |

(Continued)

OTHER PUBLICATIONS

"Guide to Design of Slabs-on-Ground," Reported by ACI Committee 360, American Concrete Institute, Apr. 2010.

*Primary Examiner* — Brent W Herring
(74) *Attorney, Agent, or Firm* — Peter J. Van Bergen

(57) ABSTRACT

A ground site for a building is prepared for construction of a portland cement concrete slab-on-grade (PCC SoG). Using a computerized weather application, weather conditions for a geographic locale that includes the ground site are monitored to identify a window-of-time during which the weather application indicates there is a less than 50% chance of precipitation at the geographic locale. The surface of the ground site is proof rolled during the window-of-time. Using concrete emplacement equipment during the window-of-time and only after the ground site passes proof rolling, wet concrete is emplaced on the ground site to a nominal thickness that does not exceed 7 inches and that is at least one inch less than a PCC SoG design for the ground site having a design thickness based on design guidelines set forth by the American Concrete Institute. Emplacing must be completed with at least 4 hours remaining in the window-of-time.

34 Claims, 5 Drawing Sheets

(56) References Cited

U.S. PATENT DOCUMENTS

| | | | | |
|---|---|---|---|---|
| 11,828,904 | B2* | 11/2023 | Sherlock | G06Q 50/08 |
| 2005/0222770 | A1* | 10/2005 | McKewon | G01W 1/10 |
| | | | | 702/3 |
| 2007/0150147 | A1* | 6/2007 | Rasmussen | E01C 19/004 |
| | | | | 701/50 |
| 2009/0242731 | A1* | 10/2009 | Dinkins | E01C 9/004 |
| | | | | 249/83 |
| 2013/0216704 | A1* | 8/2013 | Brien | E01C 21/00 |
| | | | | 427/136 |
| 2018/0002882 | A1* | 1/2018 | Stromsoe | E01C 19/266 |
| 2019/0228366 | A1* | 7/2019 | Nash | G01S 19/51 |
| 2021/0116601 | A1* | 4/2021 | Sherlock | G06Q 50/08 |

* cited by examiner

US 11,946,211 B1

PORTLAND CEMENT CONCRETE SLAB-ON-GROUND FABRICATION METHOD FOR PERFORMANCE SATISFACTION AND REDUCED CARBON EMISSION

FIELD OF THE DISCLOSURE

This disclosure relates generally to the fabrication of portland cement concrete (PCC) slabs-on-ground (SoGs), and more particularly to methods and systems for the fabrication of PCC SoGs to yield a constructed PCC SoG that can satisfy performance criteria, while also yielding a substantial reduction in carbon emission associated with the constructed PCC SoG.

BACKGROUND

Portland cement concrete (or "PCC" as it will be referred to hereinafter) is a standard construction material used in the construction of what are known as floor "slabs-on-ground" (or "SoG" as it will be referred to hereinafter) for buildings, i.e., portland cement concrete floor slabs-on-ground constructed on a ground surface. For any building that will include a PCC SoG, the following are true:
- a building's owner wants the building's floor to be constructed such that it will satisfy the maximum load criteria and resist cracking;
- PCC is a relatively inexpensive and readily-available floor construction material; and
- PCC SoG floor designers and fabricators do not want to be in breach of a construction contract.

Given the above, PCC SoG floor designers and fabricators follow a professional standards of practice to design/fabricate concrete floors. More specifically, PCC SoGs are designed/fabricated to nominal thicknesses that are in accordance with the design method specified by the American Concrete Institute (ACI) in their publication entitled "Guide to Design of Slabs-on-Ground," Publication No. ACI PRC-360R-10 (2010). In many cases, the ACI-sanctioned design method yields a nominal PCC SoG thickness of 8 to 10 inches or more. For example, large warehouses are typically designed/fabricated using the ACI-sanctioned design method to have a PCC SoG thickness of 11 to 14 inches. By following the conservative thickness design guidelines set forth by ACI, the floor designer produces a PCC SoG design that is generally guaranteed to satisfy performance requirements. However, such performance guarantee is achieved at the expense of requiring unnecessarily large quantities of PCC to be used to fabricate the SoG having a too conservatively designed thickness. Unfortunately, the manufacture of portland cement requires a great deal of heat that is typically generated by furnaces burning fossil fuels that, in turn, generate large quantities of carbon dioxide that are released into the Earth's atmosphere. As is well-known, carbon dioxide gets trapped in the Earth's atmosphere and serves as a contributor to global warming and climate change. Currently, it is estimated that the manufacture of each cubic yard of PCC (made using approximately 520 pounds of portland cement) results in the emission of about 480 pounds of carbon dioxide into the atmosphere, and that the manufacture of portland cement currently contributes about 7% of the world's total carbon dioxide emissions.

SUMMARY

Accordingly, it is an object of the present disclosure to describe methods and systems for PCC SoG fabrication.

Another object of the present disclosure is to describe methods and systems for fabricating a PCC SoG that can satisfy performance criteria, while simultaneously reducing carbon dioxide emissions associated with the PCC SoG.

A further object of the present disclosure is to describe methods and systems for fabricating a PCC SoG that reduces carbon dioxide emissions and quantifies the reduction as a means of adding commercial and environmental value to the fabricated PCC SoG.

Other objects and advantages of the methods and systems described herein will become more obvious hereinafter in the specification and drawings.

In accordance with methods and systems described herein, a ground site having a surface is prepared for construction of a portland cement concrete slab-on-grade (PCC SoG) of a building. Using a computerized weather application operable on an electronic device, weather conditions for a geographic locale that includes the ground site are monitored to identify a window-of-time during which the weather application indicates there is a less than 50% chance of precipitation at the geographic locale. The surface of the ground site is proof rolled during the window-of-time wherein the ground site is assigned a passing grade or a failing grade. Using concrete emplacement equipment during the window-of-time and only after the passing grade is assigned, wet concrete is emplaced on the surface of the ground site to a nominal thickness that does not exceed 7 inches and that is at least one inch less than a PCC SoG design for the ground site having a design thickness based on design guidelines set forth by the American Concrete Institute. The step of emplacing must be completed with at least 4 hours remaining in the window-of-time.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
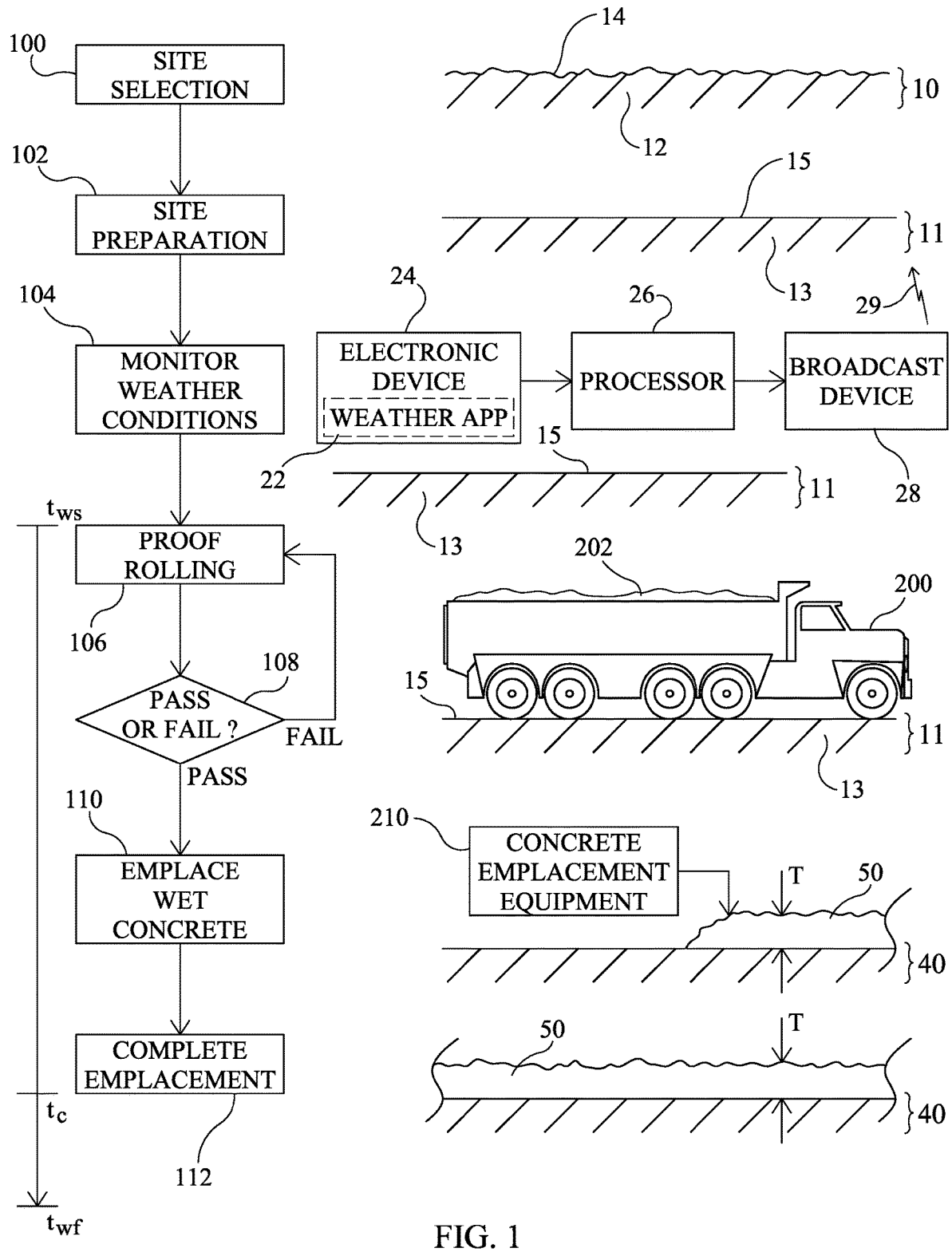
FIG. 1 is a flow diagram and corresponding schematic illustrations of an embodiment of a method of fabricating a PCC SoG in accordance with various aspects as described herein.

The methods and systems described herein present a new approach for PCC SoG fabrication that will guarantee both the satisfaction of design performance criteria and the simultaneous reduction of carbon dioxide emissions (or simply carbon emissions) associated with the PCC SoGs construction. As used herein, a PCC SoG refers to a concrete slab-on-ground that is fabricated directly on a ground surface using PCC. A PCC SoG does not support any loads associated with the building structure itself, but only supports loads associated with those items that will be placed or operated directly upon it at some time (e.g., construction equipment, product inventory, storage racks, material handling equipment, vehicles, etc.). A PCC SoG is not, therefore, a structural building element, and consequently its thickness design is not governed by a statutory building code. The maximum loading associated with all the various items that will be placed upon a PCC SoG at some time is known as the PCC SoG's maximum live loading.

To satisfy design performance criteria, a PCC SoG of the type described above must be able to withstand its expected maximum live loading, while also resisting unwanted surface cracking. In accordance with their professional standards of practice, PCC SoG designers generally achieve these goals using the design criteria set forth by the American Concrete Institute (ACI). More specifically, the professional standard relied upon is set forth in "Guide to Design of Slabs-on-Ground," ACI Publication No. ACI-360R-10 (2010), that requires a factor of safety of at least 1.4 for all PCC slab thickness designs regardless of the type of loading for the designated PCC SoG. The PCC SoG thickness design methodology set forth by ACI is referred to hereinafter as the "ACI design method".

As noted above, because a PCC SoG is not involved in the transmission of building loads to the ground, it is not considered to be part of the building's structure, and consequently, its thickness design is not covered by the building code governing the building's structural design. Strictly speaking, therefore, the ACI design method is not legally mandated. Nonetheless, it is still generally recognized by PCC SoG designers to be the PCC SoG thickness design methodology most aligned with their professional standards of practice. By extension, SoG fabricators, real estate professionals, building owners, and insurance professionals, also hold the ACI design method in equal esteem and rely upon it as the baseline design providing an implied guarantee of performance. When a building's PCC SoG can be "advertised" as being designed/fabricated in accordance with the ACI design method, all parties associated with the building are confident that the delivered PCC SoG will perform as needed. Unfortunately, this confidence comes with high financial and environmental costs, since the ACI design method typically yields PCC SoG thicknesses of 8-10 inches or more. Financial costs increase with increasing PCC SoG thickness as the volume of PCC required also increases. Similarly, environmental costs increase with increasing PCC SoG thickness, since the production of the PCC from which the SoG is made generates enormous amounts of carbon dioxide emissions.

The methods and systems described herein present a PCC SoG design and fabrication approach that, when followed, inherently provides a PCC SoG that will not only satisfy its performance criteria, but also greatly reduce the carbon emissions associated with its production. In some embodiments, portions of the method may be documented for presentation to a "consumer" (e.g., building buyer/owner, real estate professional, insurance professional, etc.) as a type of documented guarantee of performance. In some embodiments, carbon emission reductions or savings associated with the delivered PCC SoG relative to the carbon emissions associated with the accepted baseline ACI design method may be determined. In some embodiments, such carbon emission reductions may be converted to a score indicative of a quality rating of the PCC SoG and/or indicative of what are known as "carbon credits" and/or "carbon offset credits" that may be exchanged or bought/sold on a commercial market for such credits. In some embodiments, documentation of portions of the PCC SoG's fabrication method may be generated as a performance guarantee along with generation of the PCC SoG's score that may include a commercially-exchangeable carbon credits and/or carbon offset credits. In some embodiments, the carbon credits and/or carbon offset credits may be stored at a central repository. In some embodiments, stored credits may be accumulated in a user account at a central repository for subsequent use, transfer, sale, etc. Accordingly, the methods and systems described herein present a new and novel PCC SoG design and fabrication paradigm yielding high-quality and lower-cost PCC SoGs having reduced carbon emissions associated therewith to thereby provide value to the building owners as well as the environment.

As used herein, the terms "carbon credits" and "carbon offset credits" refer to a quantifiable value, the existence of which may be embodied in/as a transferrable instrument representing, for example, an amount of carbon dioxide saved or not emitted into the atmosphere. The quality of carbon credits and/or carbon offset credits is enhanced when the credits possess what is known as "additionality". Briefly, the concept of additionality is satisfied when a particular activity (e.g., amount of concrete required to fabricate a slab in accordance with the methods and systems described herein) leads to lower levels of carbon dioxide emission than that required by a baseline version of the same activity (e.g., amount of concrete required to fabricate a slab in accordance with the baseline ACI design method). As will be explained further below, the methods and systems of the present disclosure may include the secure storage and retention of such carbon credits and/or carbon offset credits to provide an industry-standard clearinghouse for such credits. In this way, the carbon credits and/or carbon offset credits will be "additionality enhanced" since the clearinghouse system provides the opportunity to sell/transfer such credits to thereby incentivize future reduced-carbon PCC SoG fabrications.

Referring now to the drawings and more particularly to FIG. 1, a flow diagram is illustrated of an embodiment of a method of fabrication of a PCC SoG in accordance with the present disclosure. Adjacent to the various blocks outlining the method steps are schematic illustrations of exemplary implementations of the method steps. Adherence to the method steps presented in FIG. 1 will yield a PCC SoG capable of satisfying performance criteria while also requiring less concrete (e.g., less PCC) than would be required if the PCC SoG were fabricated in accordance with the ACI design method. In general, adherence to the method steps shown in FIG. 1 allows for fabrication of a PCC SoG having a nominal thickness that will not exceed 7 inches for a given ground site regardless of the PCC SoG's maximum live loading, where such nominal thickness will also be at least one inch less than a nominal thickness prescribed by the ACI design method for a PCC SoG exposed to the same maximum live loading at the same ground site. In the vast majority of cases, a nominal thickness of 6 inches or less may be used when implementing the methods and systems described herein. In some applications, a nominal thickness not to exceed 7 inches may be used if/when market conditions dictate a preference for a 7 inch nominal thickness PCC SoG, notwithstanding the absence of any technical justification therefor.

Referring to FIG. 1, an embodiment of a method in accordance with the present disclosure begins at block 100 where a ground site 10 for a building is selected. Ground site 10 will generally have a sub-surface 12 and a ground surface 14, both of which must undergo preparatory treatment prior to having a PCC SoG fabricated thereon. That is, any ground site 10 will require preparation and/or remediation prior to having a PCC SoG fabricated thereon. Accordingly, sub-surface 12 and ground surface 14 are prepared at block 102. Such site preparation may include removal of existing top soils, removal of existing subsoils, repair of sinkholes, installation of perimeter water barriers, installation of engineered fill materials, grading to required elevations, application of stabilization materials (e.g., portland cement or lime), compaction to specified Proctor density, and any other site preparations that may be required.

In some embodiments, the results of a geotechnical engineering report may be used to identify areas of sub-surface 12 that may be suspect or problematic. Such areas may be indicated particularly by the report's boring log. One or more suspect locations or areas of sub-surface 12 may be indicated by conditions that include, but are not limited to, the presence of organic matter, the presence of gas-filled voids, the presence of liquid-filled voids, and the presence of shrink-swell soil. When one or more of these sub-surface conditions are indicated, the proof rolling portion of the presently-disclosed method (to be described further below) must be performed multiple times at ground surface 14 that is above each of the suspect locations or areas.

At the conclusion of site preparation at block 102, a prepared ground site 11 having a compacted sub-surface 13 and a groomed top surface 15 is ready for the next phase of the fabrication process. In some embodiments and as explained further below, the prepared ground site 11 may also include the marking for building support columns or the installation of building support columns 30 in a specified arrangement.

At block 104, weather conditions are monitored for a geographic locale that includes the prepared ground site 11. Weather monitoring may be provided by one or more weather applications (or "apps") 22 running on or accessed by an electronic device (e.g., a smartphone, tablet, desktop computer, etc.) 24. The choice of weather app 22 and electronic device 24 are not limitations of the present disclosure. The goal of weather monitoring block 104 is to identify a window-of-time during which there is less than a 50% chance of precipitation for the geographic locale that includes the prepared ground site 11. As will be explained further below, the window-of-time sets the time parameters for carrying out the remainder of the processing steps in accordance with the present disclosure. The length or duration of a suitable window-of-time is generally predicated on the size of the prepared ground site 11.

In some embodiments, the output of weather app 22 is provided to a processor 26 programmed with the parameters needed to automatically identify a suitable window-of-time. Such parameters may include just the duration of a suitable window-of-time. In some embodiments, processor 26 may also be programmed to consider other parameters such as a preferred time of day for commencement of a suitable window-of-time (e.g., sunrise), a minimum or maximum temperature criteria, etc. In some embodiments, when processor 26 identifies a suitable window-of-time, an alert may be generated for interpretation and transmission by a wireless broadcast device 28 coupled to processor 26. Broadcast device 28 may be any one or more device(s) used to transmit messages to, for example, other cellular devices, internet-accessing devices, phone devices, etc. In some embodiments, processor 26 and broadcast device 28 may be integrated with electronic device 24. The wirelessly-transmitted alert 29 may include one or more of a notification that a window-of-time for PCC SoG fabrication has been identified, a start day/time ("$t_{WS}$") for the window-of-time, and a duration of the window-of-time to include the end day/time ("$t_{WF}$"). The alert may be broadcast to one or more selected or relevant parties such as concrete providers, construction crews, quality control personnel, etc. As will be explained further below, all subsequent process steps must be started at or after start time $t_{WS}$ and must be completed at a completion time to that is at least 4 hours before the end time $t_{WF}$ of the window-of-time.

The start time $t_{WS}$ of the window-of-time triggers commencement of the next processing steps in accordance with the present disclosure. More specifically, the prepared ground site 11 undergoes proof rolling at block 106 where such proof rolling begins at or shortly after start time $t_{WS}$. In general, proof rolling involves driving a heavy vehicle over the parts of the prepared ground site 11 that will be receiving the PCC SoG. For example and with additional reference to FIG. 2, the prepared ground site 11 may include markings for building columns or the building columns 30 as mentioned above. The rectangular regions of the prepared ground site 11 having columns 30 at their corners are referred to as bays.

In some embodiments, proof rolling is carried out using a vehicle 200 loaded with material 202 (e.g., rocks, dirt, etc.). The gross vehicular weight of vehicle 200 loaded with material 202 should be at least 40 tons. This minimum gross vehicular weight ensures that the pressure applied to the ground site by the proof rolling will always be significantly greater than any pressure ever to be applied to the supporting soil by the PCC SoG once it is in service. Accordingly, a properly prepared ground site that has been proof rolled within the present disclosure's identified window-of-time may serve as a guarantee of a PCC SoG's performance as will be explained further below.

Figure 2:
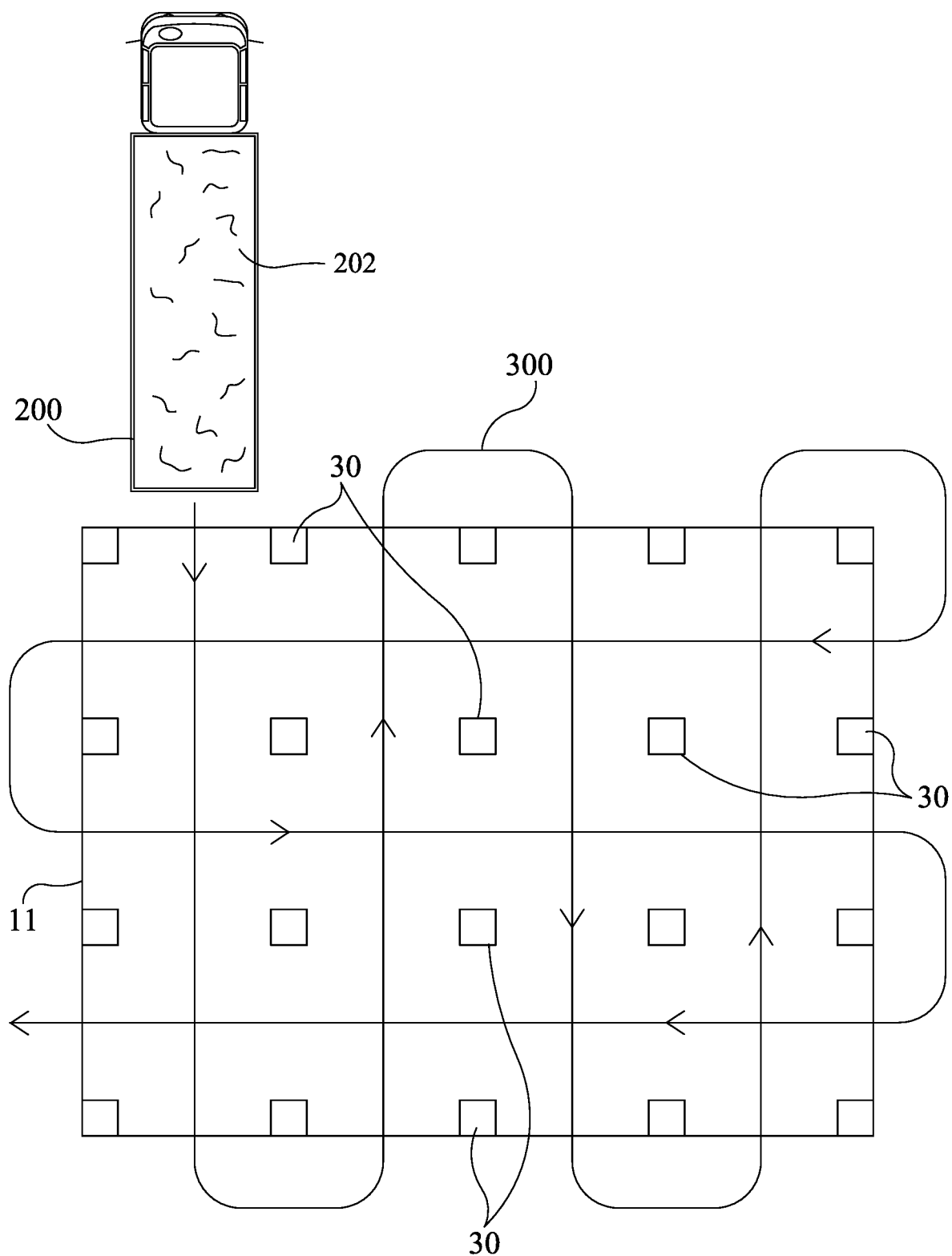
FIG. 2 is a plan view of a ground site illustrating an embodiment of a proof rolling pattern in accordance with various aspects as described herein.

A method of proof rolling in accordance with the present disclosure is illustrated in FIG. 2. As illustrated, the above-described loaded vehicle 200 may be driven over all bays of the prepared ground site 11 between columns 30. For example, when columns 30 are arranged in a rectangular grid, loaded vehicle 200 may be driven along a prescribed path 300 that traverses the prepared ground site 11 in a crosshatch pattern (as shown) to ensure that all of the prepared ground site 11 is proof rolled.

The proof rolling of the prepared ground site 11 is monitored to locate any soft or compressible areas near the groomed surface 15 that are unsuitable for construction. For example, excess moisture at or near the groomed surface 15 is indicated if loaded vehicle 200 generates ruts as it is driven over the groomed ground surface 15. Unsuitable wet subgrade soils are indicated when the soil beneath the wheels of loaded vehicle 200 is either depressed and then rebounds or is pumped upward. If any of these situations occur, the prepared ground site 11 is considered to have failed proof rolling as noted at decision block 108. If none of these situations occur, the prepared ground site 11 is said to have passed the proof rolling step 106 as noted at decision block 108.

If any of the prepared ground site 11 fails the proof rolling step 106 for one or more of the reasons discussed above, the resulting failure indication at block 108 triggers/requires remediation at each failed area of the prepared ground site 11. In accordance with the present disclosure, the sub-surface 13 and/or the groomed surface 15 must be repaired and then re-subjected to proof rolling at block 106. It is noted that such processing must take place and yield a passing grade at block 108 within the prescribed window-of-time.

The entirety of the prepared ground site 11 (to include the areas of the ground site having suspect sub-surface locations requiring multiple proof rolling passes) must achieve a pass rating at decision block 108. When this occurs, the resulting proof rolled ground site 40 is ready to have wet concrete emplaced thereon provided that the wet concrete emplacement can be completed at or prior to the prescribed completion time to where there will be at least 4 hours before the end time $t_{WT}$ of the window-of-time. Assuming this to be the case, processing proceeds to block 110 where wet concrete 50 (e.g., PCC) is emplaced on the proof rolled ground site 40 using concrete emplacement equipment 210 that may include, but is not limited to, concrete delivery trucks, concrete conveyors, and concrete pumps.

As mentioned above, the nominal thickness "T" of wet concrete 50 never exceeds 7 inches and may be 6 inches or less in many installations. However, in all cases, the nominal thickness T of wet concrete 50 will be at least one inch less than any nominal thickness prescribed by the ACI design method. Emplacement 110 continues until the entirety of proof rolled ground site 40 has wet concrete 50 emplaced thereon to the nominal thickness T. When this occurs, the concrete placement portion of the PCC SoG fabrication process is complete as indicated by block 112.

The methods and systems of the present disclosure require completion 112 to occur at or before completion time $t_C$. By satisfying all of the above processing requirements, the emplaced wet concrete 50 having the prescribed nominal thickness T will, when cured, satisfy all performance criteria related to maximum live load capacity. In addition, since the emplaced wet concrete 50 is at least one inch thinner than any PCC SoG prescribed by the ACI design method, carbon emissions associated with the emplaced wet concrete 50 (and ultimate cured PCC SoG) will be less than any PCC SoG prescribed by the ACI design method.

In some embodiments and as mentioned previously above, methods and systems of the present disclosure may provide for the generation of a documented guarantee of performance of the PCC SoG for presentation to one or more of a building's buyer/owner, a real estate professional, and an insurance professional. Since a timely proof rolled ground site (i.e., a "pass" is achieved within the prescribed window-of-time) is a valuable and reliable indicator of a PCC SoG's performance, a documented guarantee of performance in accordance with the present disclosure may include a video recording of the critical proof rolling of a prepared ground site.

Figure 3:
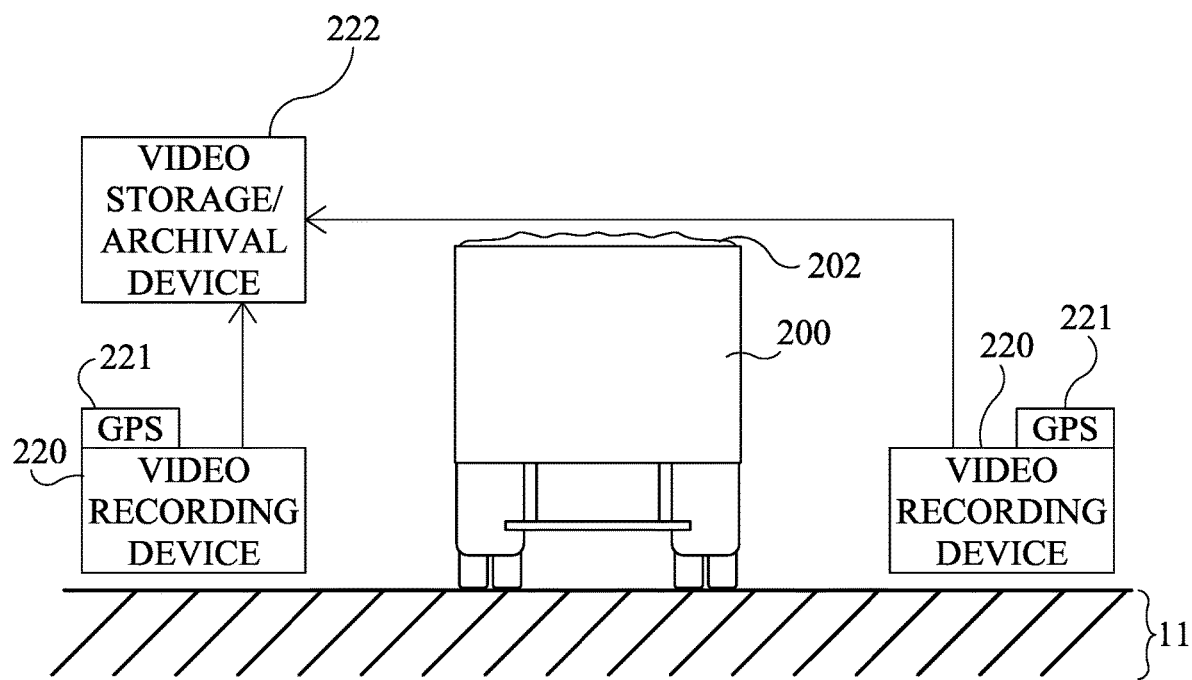
FIG. 3 is an elevational view of a portion of a ground site illustrating an embodiment of ground-site proof rolling to include the recordation and archiving of the results of the proof rolling being in accordance with various aspects as described herein.

An exemplary method and system for recording the proof rolling aspect described herein is presented and will be explained with reference to FIG. 3. For example, one or more video recording devices 220 may be disposed to record an elevational view(s) of the prepared ground site 11 as loaded vehicle 200 is driven there over during proof rolling as described above. Recording devices 220 may be coupled to a video storage/archival device 222 that generates a record of the video where such record may form a portion of a documented guarantee of performance for the PCC SoG that is to be fabricated on the ground site. In some embodiments, each recording device 220 may be configured to track along with loaded vehicle 200 either independently or by being coupled to loaded vehicle 200. In such cases, each recording device 220 may include a GPS 221 that generates a time and location "stamp" that may be indexed with the video recording of the ground site during the proof rolling thereof. That is, the day/time and location of each portion of the proof rolled ground site are recorded/archived along with the video such that both may be easily retrieved and/or viewable if/when the archived recording is replayed. The recording of the day/time may be used to document and guarantee that the proof rolling occurred within the prescribed window-of-time, while the recording of the location may be used to assure that the entire ground site was proof rolled within the prescribed window-of-time.

As mentioned above, some embodiments may include the generation and documentation of carbon emission reduction made possible by the methods and systems of the present disclosure. Currently, the PCC SoG construction industry relies on the ACI design method for the design of a PCC SoG-on-ground which defines a nominal thickness for each such slab design. Accordingly, determination of a quantifiable carbon emission reduction in accordance with the present disclosure will be referenced to the ACI design method that will always yield a PCC SoG design having a nominal thickness that is at least one inch thicker than a PCC SoG fabricated in accordance with the present disclosure.

Figure 4:
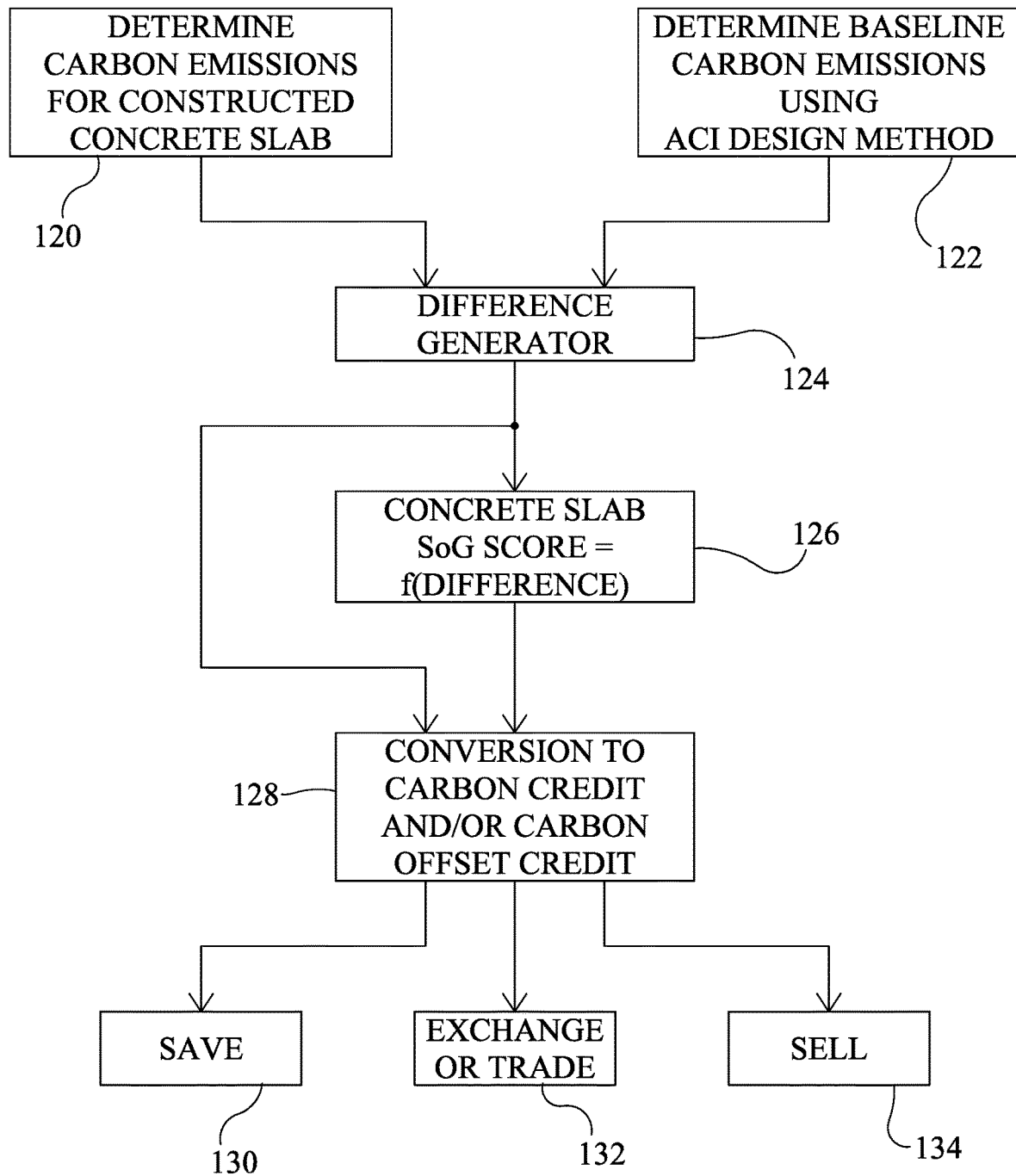
FIG. 4 is a flow diagram of an embodiment of a method of determining carbon emission savings and carbon credits and/or carbon offset credits associated with the method of fabricating a PCC SoG in accordance with various aspects as described herein.

The methods and systems of the present disclosure may be extended to the determination of the carbon emission savings made possible by fabricating a PCC SoG as described herein and shown in FIG. 1. Referring now to FIG. 4, a flow diagram is illustrated to describe an embodiment of such carbon emission savings determination. At block 120, carbon emissions (e.g., an amount of carbon dioxide in tons to be released into the atmosphere) associated with the construction of a PCC SoG as described above and shown in FIG. 1 are determined. In general, block 120 considers most or all sources of carbon dioxide generation/release/recapture to include the manufacturing of the amount of portland cement that will be required, the vehicle emissions occasioned by the cement's delivery to the concrete manufacturing plant, the vehicle emissions occasioned by the concrete's delivery from the concrete manufacturing plant to the ground site, the equipment emissions occasioned by the concrete's emplacement upon the ground site, and the carbon dioxide recaptured by the PCC SoG through carbonization once it is has been fabricated. Block 120 may be performed before or after the PCC SoG is constructed in accordance with the present disclosure. Block 120 may be performed in accordance with any accepted carbon emission calculation schemes used in industry settings currently or in the future as the field of carbon emission calculation evolves.

At block 122, the ACI design method is used to determine a baseline amount of carbon emissions, e.g., an amount of carbon dioxide in tons that would be released into the atmosphere if the ACI design method were used to fabricate the PCC SoG. Block 122 may be performed before or after the PCC SoG is constructed in accordance with the present disclosure. By way of an illustrative example, block 122 may be performed in accordance with the same carbon emission calculation scheme used in block 120.

The values generated at blocks 120 and 122 are passed to a difference generator block 124 that essentially subtracts the carbon emission value (e.g., tons of carbon dioxide) determined at block 120 from the carbon emission value (e.g., tons of carbon dioxide) determined at block 122. In some embodiments, the difference generated at block 124 may be sufficient to show the value associated with the PCC SoG fabricated in accordance with the present disclosure. That is, the difference generated at block 124 may serve as a measure of the above-described "additionality", e.g., a calculation of the amount of carbon dioxide emissions saved when designing/fabricating a concrete slab in accordance with the methods and systems of the present disclosure as compared to the same concrete slab designed/fabricated in accordance with the baseline ACI design method.

In some embodiments, the difference generated at block 124 may be used to indicate a score value or rating at block 126. For example, block 126 may generate a score (e.g., a "SoG" score as referred to hereinafter) as a function of the difference generated at block 124. In some embodiments, the score may be a dimensionless value that indicates, for example, both a maximum live load capacity for the PCC SoG fabricated in accordance with the present disclosure as well as a maximum carbon emission associated with the PCC SoG fabricated in accordance with the present disclosure. By way of an illustrative example, a dimensionless SoG score value may be a direct recitation of both quantities, e.g., SoG score of X/Y where X is the maximum load capacity and Y is the maximum carbon emission determined at block 120. In some embodiments, the SoG score may be determined in accordance with a linear or non-linear algorithm that generates a single number or letter (grade) that becomes known and accepted in the PCC SoG industry.

In some embodiments, the difference generated at block 124 and/or the score generated at block 126 may be converted to a carbon credit and/or carbon offset credit at block 128. In general, the credit would be one that is accepted on a commercial market for such credits. For example, the carbon emission savings generated at block 124 may be converted on a one-to-one basis (or some other linear or non-linear relationship) to a carbon credit and/or carbon offset credit. The difference generated at block 124 may also or alternatively be used as a measure of additionality, e.g., a calculation of the amount of concrete saved by using the methods/systems described herein as compared to the amount of concrete required by the baseline ACI design method. In some embodiments, the carbon emission savings portion of the SoG score generated at block 126 may be used as a carbon credit and/or carbon offset credit, or indicator thereof. In some embodiments, the SoG score may be equated to carbon credits and/or carbon offset credits where a higher score may be indicative of a greater number of credits.

The carbon credits and/or carbon offset credits generated at block 128 may be saved as indicated at block 130, exchanged or traded as indicated at block 132, and/or sold as indicated at block 134. The benefits associated with the carbon credits and/or carbon offset credits may accrue to one or more of construction contractors, a building's buyer/owner, etc. In this way, a building's fabricator, buyer/owner, etc., is/are incentivized to construct a performance-guaranteed PCC SoG that is more economical to fabricate while simultaneously reducing carbon dioxide emissions therewith as compared to a PCC SoG fabricated in accordance with the baseline ACI design method. Decisions related to the handling of carbon credits and/or carbon offset credits may also be predicated on government rules, regulations, and/or programs.

In some embodiments, the handling of determined carbon credits and/or carbon offset credits in one or more of the ways indicated at blocks 130, 132, and 134 may include the use of a central repository serving as a clearinghouse for the secure storage, exchange, trade, and/or sale of such credits.

Figure 5:
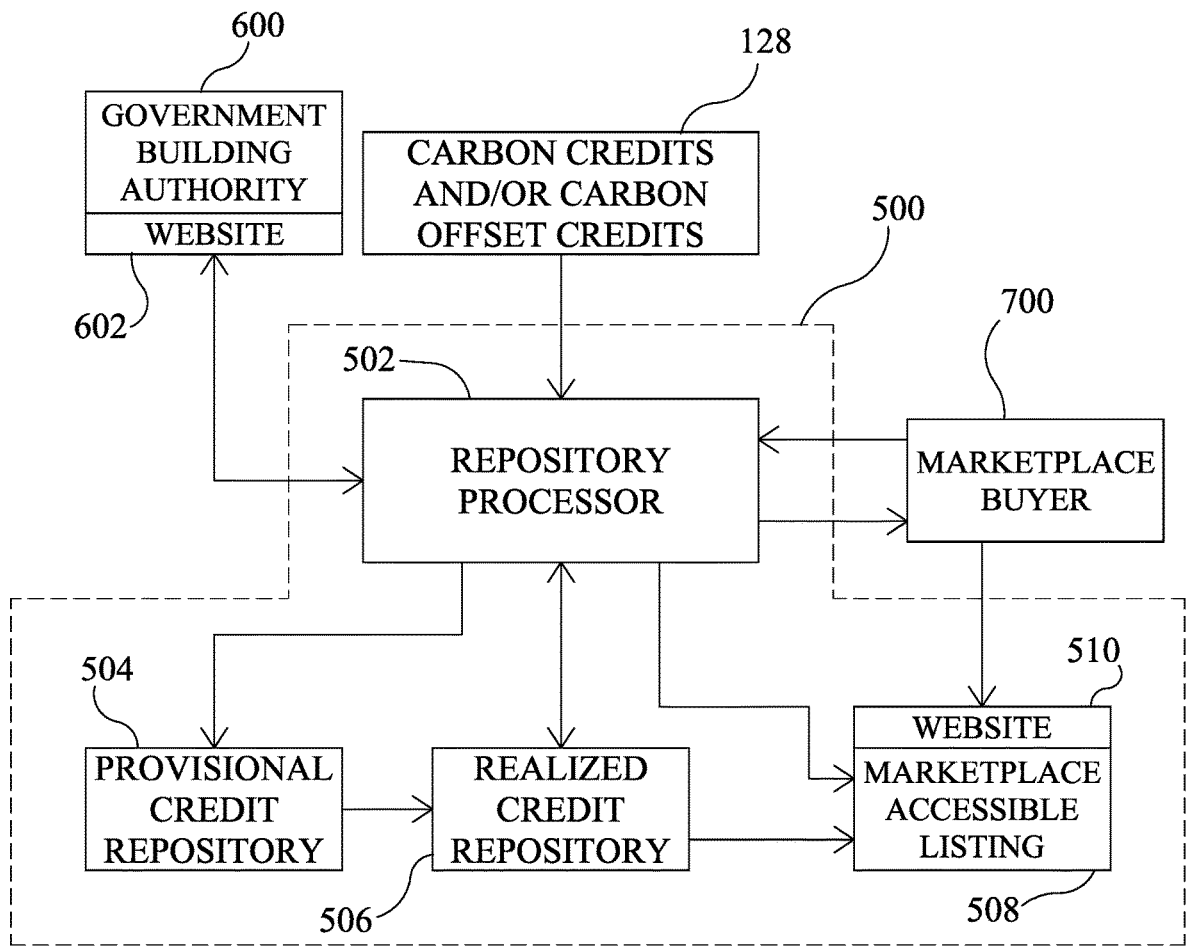
FIG. 5 is a schematic view of an embodiment of a clearinghouse system for the handling of additionality-enhanced carbon credits and/or carbon offset credits in accordance with various aspect as described herein.

Referring now to FIG. 5, an embodiment of a clearinghouse system for the handling of credits determined at block 128 (FIG. 4) is illustrated generally within a dashed-line region 500. Clearinghouse system 500 includes a repository processor 502, a provisional credit repository 504, a realized credit repository 506, and a marketplace-accessible listing 508 of credits available for purchase, exchange, etc. Realization of clearinghouse system 500 may be achieved with any combination of hardware and software constructs without departing from the scope of the present disclosure. For example, clearinghouse system 500 may be a cloud-based system accessible via an internet connection. Repositories 504 and 506 may be realized by separate or shared hardware and/or software-construct database(s) used for the storage of data. Communications to, from, and/or within clearinghouse system 500 may be handled using wired and/or wireless technologies without departing from the scope of the present disclosure.

At the outset, carbon credits and/or carbon offset credits determined at block 128 (FIG. 4), or some value indicative thereof, along with relevant and corresponding identifying information are provided to repository processor 502. Such identifying information may include, but is not limited to, customer name/number (e.g., a building's owner), an address of the corresponding construction project, expected completion date of the construction project, a government building authority for the construction project and their corresponding website, etc. The determined credits and corresponding identifying information may be provided to repository processor 502 in a variety of ways without departing from the scope of the present disclosure. Since such credits are not realized until a construction project is complete, processor 502 stores the credits indexed with their corresponding identifying information in provisional credit repository 504. Upon verification of a construction project's completion, processor 502 facilitates the movement/transfer of at least a portion of the credits associated with the completed construction project and at least portions of the corresponding identifying information from provisional credit repository 504 to realized credit repository 506. For example, a customer's name and/or number could be logged along with their realized credits for secure storage similar to a bank account.

In some embodiments, a construction project's completion may be considered to be "verified" when a "certificate of occupancy" (or "CO") has been issued by the local government building authority overseeing building code compliance for the construction project. Accordingly, in some embodiments, repository processor 502 may monitor a government building authority 600 (e.g., via the authority's website 602) to see if/when a CO has been issued for the construction project for which credits have been provisionally stored at provisional repository 504. Since building permits, inspections, and CO information are of public record and are generally available for viewing over the internet, repository processor 502 may be configured/programmed to periodically monitor and/or query an appropriate website 602 of government building authority 600 about the construction project (e.g., via an address, lot number, building permit number, etc.) commencing on or near the expected completion date of the construction project.

Repository processor 502 may be configured/programmed to generate a marketplace-accessible listing 508 that is updated whenever credits are added to or removed from realized credit repository 506. That is, listing 508 only presents or advertises those credits that are stored in realized credit depository 506. Listing 508 may be made readily accessible by the general public via, for example, an internet-accessed website 510. In some embodiments, listing 508 may simply present a total number of credits stored in realized credit repository 506 that are available for sale, exchange, etc. In some embodiments, listing 508 may be a listing of anonymously-identified customers owing realized credits stored at realized credit repository 506, e.g., Customer A has 5000 credits, Customer B has 500 credits, Customer C has 37,000 credits, etc., where the true identities of A, B, C are not revealed in listing 508. Any credits stored in realized credit repository 506 may be presented or advertised to the general public in listing 508 via website 510. In some embodiments, all credits in realized credit repository 506 are automatically presented/advertised in listing 508. In some embodiments, each owner of such credits may decide (e.g., via instructions provided to clearinghouse system 500) if and/or when any of their credits they wish to present/advertise on listing 508 or remove from listing 508. For any credits listed on listing 508, a marketplace buyer 700 may submit a purchase/exchange request to clearinghouse system 500 (e.g., as handled by repository processor 502) for the handling/processing of such purchase/exchange. Upon receipt and verification of an agreed upon compensation, repository processor 502 then transfers the requested credits to marketplace buyer 700 and updates the credit storage in realized credit repository 506 and the credit availability presented/advertised to the general marketplace via listing 508.

The advantages of the methods and systems described herein are numerous. A building's PCC SoG fabricated as described herein will satisfy performance criteria, while also reducing carbon dioxide emissions as compared to a PCC SoG constructed in accordance with the ACI design method. The methods and systems may include documentation of critical parts of the fabrication method where such documentation may serve as a performance guarantee. The methods and systems may also include determination of carbon emission savings and carbon credits associated with the fabricated PCC SoG. The methods and systems of the present disclosure may also incorporate a clearinghouse system maintaining commercially-exchangeable and additionally-enhanced credits to incentivize future projects that will yield carbon-reduced results.

Although the methods and systems presented herein have been described for specific embodiments thereof, there are numerous variations and modifications that will be readily apparent to those skilled in the art in light of the above teachings. For example, the methods and systems described herein may be extended to other types of projects other than PCC SoG where additionality-enhanced carbon credits and/ or carbon offset credits are generated to incentivize better environmental choices in the design and fabrication of future projects. It is therefore to be understood that, within the scope of the appended claims, the methods and systems presented herein may be practiced other than as specifically described.

What is claimed as new and desired to be secured by Letters Patent of the united states is:

1. A method, comprising:
   providing a ground site having a surface;
   preparing the ground site for construction of a portland cement concrete slab-on-ground (PCC SoG) of a building;
   monitoring, using a computerized weather application operable on an electronic device, weather conditions for a geographic locale that includes the ground site to identify a window-of-time during which the weather application indicates there is a less than 50% chance of precipitation at the geographic locale;
   proof rolling the surface of the ground site during the window-of-time wherein the ground site is assigned a passing grade or a failing grade, wherein the step of preparing the ground site includes identifying locations of columns for the building at the surface of the ground site wherein bays of the building are identified between sets of the locations, and wherein the step of proof rolling is carried out for each of the bays;
   emplacing, using concrete emplacement equipment during the window-of-time and only after the passing grade is assigned, wet concrete on the surface of the ground site to a nominal thickness that does not exceed 7 inches and that is at least one inch less than a PCC SoG design for the ground site having a design thickness based on design guidelines set forth by the American Concrete Institute; and
   completing the step of emplacing with at least 4 hours remaining in the window-of-time.

2. The method of claim 1, wherein the step of proof rolling includes:
   providing a ground vehicle loaded to a gross vehicular weight of at least 40 tons;
   dividing the surface of the ground site into identifiable regions; and
   driving the ground vehicle on the surface of each of the identifiable regions in accordance with a crosshatch pattern.

3. The method of claim 1, further comprising
   determining a first value indicative of carbon emission associated with a constructed PCC SoG yielded by the steps of emplacing and completing;
   determining a second value indicative of carbon emission associated with the PCC SoG design for the ground site based on the design guidelines set forth by the American Concrete Institute, wherein the design thickness of the PCC SoG design is determined using a thickness design method set forth in the American Concrete Institute's Publication No. 360R-10, and wherein the thickness design method uses a factor of safety of at least 1.4; and
   determining a difference between the first value and the second value.

4. The method of claim 3, further comprising:
   storing a value indicative of the difference at a database; and
   advertising at least a portion of the value stored at the database via an internet-accessible website after the building is completed.

5. The method of claim 3, further comprising assigning a score value for the constructed PCC SoG based on the difference.

6. The method of claim 5, wherein the score value comprises a dimensionless value simultaneously indicative of a maximum live load capacity of the constructed PCC SoG and a maximum carbon emission associated with the constructed PCC SoG.

7. The method of claim 5, wherein the score value comprises a commercially-exchangeable carbon credit.

8. The method of claim 1 further comprising recording, using a video recording device, a time and location indexed elevational view of the surface of the ground site during the step of proof rolling.

9. The method of claim 1, further comprising:
   identifying, using a geotechnical engineering report on the ground site, suspect locations beneath the surface of the ground site, each of the suspect locations having at least one sub-surface condition selected from the group consisting of the presence of organic matter, the presence of gas-filled voids, the presence of liquid-filled voids, and the presence of shrink-swell soil; and performing the step of proof rolling multiple times at the surface of the ground site over each of the suspect locations.

10. The method of claim 1 further comprising, prior to the step of proof rolling, wirelessly broadcasting a notification indicative an identification of the window-of-time, a start time for the window-of-time, and a duration of the window-of-time.

11. A method, comprising:

providing a ground site having a surface;

identifying, using a geotechnical engineering report on the ground site, suspect locations beneath the surface of the ground site, each of the suspect locations having at least one sub-surface condition selected from the group consisting of the presence of organic matter, the presence of gas-filled voids, the presence of liquid-filled voids, and the presence of shrink-swell soil;

preparing the ground site for construction of a portland cement concrete slab-on-ground (PCC SoG) of a building;

monitoring, using a computerized weather application operable on an electronic device, weather conditions for a geographic locale that includes the ground site to identify a window-of-time during which the weather application indicates there is a less than 50% chance of precipitation at the geographic locale;

proof rolling the surface of the ground site during the window-of-time to include proof rolling the surface of the ground site over each of the suspect locations multiple times, wherein the ground site is assigned a passing grade or a failing grade after the step of proof rolling;

generating, using a video recording device, an archival video record of the surface of the ground site as the step of proof rolling is being performed, wherein the archival video record includes time data and location data for each portion of the surface of the ground site;

emplacing, using concrete emplacement equipment during the window-of-time and only after the passing grade is assigned, wet concrete on the surface of the ground site to a nominal thickness that does not exceed 7 inches and that is at least one inch less than a PCC SoG design for the ground site having a design thickness based on design guidelines set forth by the American Concrete Institute; and completing the step of emplacing with at least 4 hours remaining in the window-of-time, wherein a constructed PCC SoG is generated by the steps of emplacing and completing and wherein the archival video record comprises a portion of a guarantee of performance associated with the constructed PCC SoG.

12. The method of claim 11, wherein the step of preparing the ground site includes identifying locations of columns for the building at the surface of the ground site wherein bays of the building are identified between sets of the locations, and wherein the step of proof rolling is carried out for each of the bays.

13. The method of claim 11, wherein the step of proof rolling includes:

providing a ground vehicle loaded to a gross vehicular weight of at least 40 tons;

dividing the surface of the ground site into identifiable regions; and driving the ground vehicle on the surface of each of the identifiable regions in accordance with a crosshatch pattern.

14. The method of claim 11, further comprising determining a first value indicative of carbon emission associated with the constructed PCC SoG;

determining a second value indicative of carbon emission associated with the PCC SoG design for the ground site based on the design guidelines set forth by the American Concrete Institute, wherein the design thickness of the PCC SoG design is determined using a thickness design method set forth in the American Concrete Institute's Publication No. 360R-10, and wherein the thickness design method uses a factor of safety of at least 1.4; and determining a difference between the first value and the second value.

15. The method of claim 14, further comprising:

storing a value indicative of the difference at a database; and advertising at least a portion of the value stored at the database via an internet-accessible website after the building is completed.

16. The method of claim 14, further comprising assigning a score value for the constructed PCC SoG based on the difference.

17. The method of claim 16, wherein the score value comprises a dimensionless value simultaneously indicative of a maximum live load capacity of the constructed PCC SoG and a maximum carbon emission associated with the constructed PCC SoG.

18. The method of claim 16, wherein the score value comprises a commercially-exchangeable carbon credit.

19. The method of claim 11 further comprising, prior to the step of proof rolling, wirelessly broadcasting a notification indicative an identification of the window-of-time, a start time for the window-of-time, and a duration of the window-of-time.

20. A method, comprising:

providing a ground site having a surface;

preparing the ground site for construction of a portland cement concrete slab-on-ground (PCC SoG) of a building;

monitoring, using a computerized weather application operable on an electronic device, weather conditions for a geographic locale that includes the ground site to identify a window-of-time during which the weather application indicates there is a less than 50% chance of precipitation at the geographic locale;

proof rolling the surface of the ground site during the window-of-time wherein the ground site is assigned a passing grade or a failing grade after the step of proof rolling;

generating, using a video recording device, an archival video record of the surface of the ground site as the step of proof rolling is being performed, wherein the archival video record includes time data and location data for each portion of the surface of the ground site;

emplacing, using concrete emplacement equipment during the window-of-time and only after the passing grade is assigned, wet concrete on the surface of the ground site to a nominal thickness that does not exceed 7 inches and that is at least one inch less than a PCC SoG design for the ground site having a design thickness based on design guidelines set forth by the American Concrete Institute;
completing the step of emplacing with at least 4 hours remaining in the window-of-time wherein a constructed PCC SoG covers the surface of the ground site;
determining a first value indicative of carbon emission associated with the constructed PCC SoG;
determining a second value indicative of carbon emission associated with the PCC SoG design for the ground site based on the design guidelines set forth by the American Concrete Institute, wherein the design thickness of the PCC SoG design is determined using a thickness design method set forth in the American Concrete Institute's Publication No. 360R-10, and wherein the thickness design method uses a factor of safety of at least 1.4; and
determining a difference between the first value and the second value, wherein the difference is indicative of a commercially-exchangeable carbon credit associated with the constructed PCC SoG, and wherein the archival video record comprises a portion of a guarantee of performance associated with the constructed PCC SoG.

21. The method of claim 20, further comprising:
storing the commercially-exchangeable carbon credit associated with the constructed PCC SoG at a database; and
advertising at least a portion of the commercially-exchangeable carbon credit stored at the database via an internet-accessible website after the building has been completed.

22. The method of claim 20, wherein the step of preparing the ground site includes identifying locations of columns for the building at the surface of the ground site wherein bays of the building are identified between sets of the locations, and wherein the step of proof rolling is carried out for each of the bays.

23. The method of claim 20, wherein the step of proof rolling includes:
providing a ground vehicle loaded to a gross vehicular weight of at least 40 tons;
dividing the surface of the ground site into identifiable regions; and
driving the ground vehicle on the surface of each of the identifiable regions in accordance with a crosshatch pattern.

24. The method of claim 20, further comprising assigning a score value for the constructed PCC SoG based on the difference.

25. The method of claim 24, wherein the score value comprises a dimensionless value simultaneously indicative of a maximum live load capacity of the constructed PCC SoG and a maximum carbon emission associated with the constructed PCC SoG.

26. The method of claim 20, further comprising:
identifying, using a geotechnical engineering report on the ground site, suspect locations beneath the surface of the ground site, each of the suspect locations having at least one sub-surface condition selected from the group consisting of the presence of organic matter, the presence of gas-filled voids, the presence of liquid-filled voids, and the presence of shrink-swell soil; and
performing the step of proof rolling multiple times at the surface of the ground site over each of the suspect locations.

27. The method of claim 20 further comprising, prior to the step of proof rolling, wirelessly broadcasting a notification indicative an identification of the window-of-time, a start time for the window-of-time, and a duration of the window-of-time.

28. A method, comprising:
providing a ground site having a surface;
preparing the ground site for construction of a portland cement concrete slab-on-ground (PCC SoG) of a building;
monitoring, using a computerized weather application operable on an electronic device, weather conditions for a geographic locale that includes the ground site to identify a window-of-time during which the weather application indicates there is a less than 50% chance of precipitation at the geographic locale;
proof rolling the surface of the ground site during the window-of-time wherein the ground site is assigned a passing grade or a failing grade after the step of proof rolling;
emplacing, using concrete emplacement equipment during the window-of-time and only after the passing grade is assigned, wet concrete on the surface of the ground site to a nominal thickness that does not exceed 7 inches and that is at least one inch less than a PCC SoG design for the ground site having a design thickness based on design guidelines set forth by the American Concrete Institute;
completing the step of emplacing with at least 4 hours remaining in the window-of-time wherein a constructed PCC SoG covers the surface of the ground site;
determining a first value indicative of carbon emission associated with the constructed PCC SoG;
determining a second value indicative of carbon emission associated with the PCC SoG design for the ground site based on the design guidelines set forth by the American Concrete Institute, wherein the design thickness of the PCC SoG design is determined using a thickness design method set forth in the American Concrete Institute's Publication No. 360R-10, and wherein the thickness design method uses a factor of safety of at least 1.4;
determining a difference between the first value and the second value, wherein the difference is indicative of a commercially-exchangeable carbon credit associated with the constructed PCC SoG;
storing the commercially-exchangeable carbon credit associated with the constructed PCC SoG at a database; and
advertising at least a portion of the commercially-exchangeable carbon credit stored at the database via an internet-accessible website after the building has been completed.

29. The method of claim 28, wherein the step of preparing the ground site includes identifying locations of columns for the building at the surface of the ground site wherein bays of the building are identified between sets of the locations, and wherein the step of proof rolling is carried out for each of the bays.

30. The method of claim 28, wherein the step of proof rolling includes:
providing a ground vehicle loaded to a gross vehicular weight of at least 40 tons;
dividing the surface of the ground site into identifiable regions; and
driving the ground vehicle on the surface of each of the identifiable regions in accordance with a crosshatch pattern.

31. The method of claim 28, further comprising assigning a score value for the constructed PCC SoG based on the difference.

32. The method of claim 31, wherein the score value comprises a dimensionless value simultaneously indicative of a maximum live load capacity of the constructed PCC SoG and a maximum carbon emission associated with the constructed PCC SoG.

33. The method of claim 28, further comprising:
- identifying, using a geotechnical engineering report on the ground site, suspect locations beneath the surface of the ground site, each of the suspect locations having at least one sub-surface condition selected from the group consisting of the presence of organic matter, the presence of gas-filled voids, the presence of liquid-filled voids, and the presence of shrink-swell soil; and
- performing the step of proof rolling multiple times at the surface of the ground site over each of the suspect locations.

34. The method of claim 28 further comprising, prior to the step of proof rolling, wirelessly broadcasting a notification indicative an identification of the window-of-time, a start time for the window-of-time, and a duration of the window-of-time.

\* \* \* \* \*